United States Patent [19]
Matsuzawa et al.

[11] Patent Number: 5,556,681
[45] Date of Patent: Sep. 17, 1996

[54] OPTICAL INFORMATION RECORDING MEDIUM

[75] Inventors: Yoko Matsuzawa; Shin-Ichiro Tamura; Katsuya Shirai, all of Kanagawa, Japan

[73] Assignee: Sony Corporation, Tokyo, Japan

[21] Appl. No.: 299,656

[22] Filed: Sep. 2, 1994

[30] Foreign Application Priority Data

Sep. 8, 1993 [JP] Japan .................................. 5-223268

[51] Int. Cl.⁶ ...................................................... B32B 3/00
[52] U.S. Cl. ..................... 428/64.1; 428/64.2; 428/64.3; 428/64.4; 428/64.8; 428/913; 430/270.1; 430/270.11; 430/270.14; 430/945; 369/275.1; 369/275.2; 369/283; 369/288
[58] Field of Search ................................ 428/64.2, 64.3, 428/64.4, 64.8, 913, 64.1; 430/270, 495, 945, 270.1, 270.11, 270.14; 369/275.1, 275.2, 283, 288

[56] References Cited

U.S. PATENT DOCUMENTS

| 4,917,989 | 4/1990 | Albert | 430/270 |
|---|---|---|---|
| 5,132,153 | 7/1992 | Hirose | 428/64 |
| 5,200,947 | 4/1993 | Satake | 369/275.1 |
| 5,271,979 | 12/1993 | Santoh | 428/64 |

FOREIGN PATENT DOCUMENTS

| 0291848 | 5/1988 | European Pat. Off. . |
|---|---|---|
| 0420982 | 2/1989 | European Pat. Off. . |
| 0514211 | 5/1992 | European Pat. Off. . |
| 2222181 | 6/1989 | United Kingdom . |

OTHER PUBLICATIONS

Patent Abstracts of Japan, vol. 9, No. 170 & JP-A-60 047 247.

Primary Examiner—Patrick Ryan
Assistant Examiner—Elizabeth Evans
Attorney, Agent, or Firm—Hill, Steadman & Simpson

[57] ABSTRACT

An optical information recording medium is disclosed. The optical information recording medium has a transparent substrate having pits and lands corresponding to information signals formed therein, and a reflective layer formed on the transparent substrate. The reflective layer is composed mainly of a dye material and a polymeric material and has a reflectance of 15 to 25%. The polymeric material forming the reflective layer is a silicon varnish.

5 Claims, 10 Drawing Sheets

OPTICAL INFORMATION RECORDING MEDIUM

BACKGROUND OF THE INVENTION

1. Field of the Invention

This invention relates to an optical information recording medium, and particularly to a reproduction-only optical information recording medium capable of recording and/or reproduction therein by using a recording/reproducing apparatus for magneto-optical recording medium.

2. Description of the Related Art

As the optical information recording media, the compact disc (CD) and the laser disc (LD) have already been prevailed broadly. These compact disc and laser disc are reproduction-only optical discs each of which has a reflective layer and, if necessary, a protecting layer on a substrate having pits and lands corresponding to information signals formed in advance, and from which pre-recorded information signals are reproduced. A material of high reflectance, that is low absorptance, such as Al or Au is used for the reflective layer.

Meanwhile, the magneto-optical disc has been developed recently as an optical information recording medium in which information is writable and deletable, in contrast to the above-mentioned reproduction-only optical disc. The magneto-optical disc has a recording section formed by stacking a recording magnetic layer having an axis of easy magnetization perpendicular to the film surface and large magneto-optical effect (such as a rare earth-transition metal alloy amorphous thin film), a reflective layer and a dielectric layer on a substrate. The magneto-optical disc of such structure having a small diameter of 64 mm, that is, a so-called mini disc, contained in a disc cartridge is now prevailing.

Meanwhile, in order to improve prevalence and practicality of both the reproduction-only optical disc and magneto-optical disc systems, it is preferred that reproduction can be carried out with the reproduction-only optical disc by the recording/reproducing apparatus for magneto-optical disc. However, the reproduction-only optical disc having the reflective layer of Al film or Au film has an extremely high reflectance of 70% or higher to a laser light, in comparison to the reflectance of magneto-optical disc of 15 to 25%. Therefore, reproduction of signals from the reproduction-only disc cannot be carried out by the recording/reproducing apparatus for magneto-optical disc.

Thus, a dye-containing layer composed of a dye material and a polymeric material is used instead of the Al film or the Au film, as the reflective layer. For instance, an optical disc using a cyanine dye as the dye material has a reflectance of 15 to 25%, similar to that of the magneto-optical disc, and is therefore expected to be promising as a reproduction-only optical disc applicable to the recording/reproduction apparatus for magneto-optical disc.

However, since the optical disc of low reflectance using the dye-containing layer does not have a protection film, which is provided on the optical disc of high reflectance using the Al film, the surface of the dye-containing layer may be damaged or worn in contact with foreign matters.

In the optical disc having the dye-containing layer as the reflective layer, a readout light is reflected on the boundary between the substrate and the dye-containing layer and on the boundary between the dye-containing layer and the air, causing multiple interference, which is utilized for reproducing signals. Therefore, if the dye-containing layer is damaged or worn, turbulence is generated in the multiple interference of the light, disturbing reproduction of signals.

Also, since the dye-containing layer composed of the dye material and the polymeric material is difficult to dissolve in a solvent once it is hardened, recovery of compositions for recycling of used optical discs is difficult. Even though compositions of the dye-containing layer are recovered, the reflective layer formed by recycling the compositions has signal property and damage resistance inferior to those of the original reflective layer.

OBJECT AND SUMMARY OF THE INVENTION

It is therefore an object of the present invention to provide an optical information recording medium with which reproduction can be carried out by the recording/reproduction apparatus for low-reflectance media such as the magneto-optical disc, and which is highly resistant to damages and is capable of being recycled.

According to the present invention, there is provided an optical information medium having a dye-containing layer composed of at least a dye material and a polymeric material as a reflective layer formed on a transparent substrate having pits and lands corresponding to information signals formed therein. The polymeric material forming the dye-containing layer is a silicon varnish. The reflective layer has a titanium coupling agent added thereto.

The silicon varnish contains the OH group at a rate of 18 to 25% of the $CH_3$ group.

The titanium coupling agent is added into the reflective layer at a rate of 7 to 10% by weight of the polymeric material.

If the optical information recording medium having the reflective layer formed on the transparent substrate with pits and lands corresponding to information signals formed thereon employs the dye-containing layer composed mainly of the dye material and the polymeric material with a reflectance of 15 to 25% as the reflective layer, signals are reproduced from the optical information recording medium by using a recording/reproducing apparatus for a medium having a reflectance of 15 to 25% such as the magneto-optical disc.

If the dye-containing solution composed of the silicon varnish and the dye material dissolved in the solvent is applied to the substrate and then the solvent is dried to be removed, the silicon varnish is condensed with the OH group as the functional group to form the dye-containing layer of high hardness. The optical information recording medium having the dye-containing layer thus formed as the reflective layer is not easily damaged or worn in contact with foreign matters, and satisfactory reproduction characteristics can be maintained.

In addition, if the silicon varnish containing Si—OH structure at a rate of 18 to 25% of the Si—$CH_3$ structure, the optical information recording medium having high damage resistance and the permeability adapted for the MD recording/reproducing apparatus can be produced.

If the titanium coupling agent is added to the dye-containing layer as the reflective layer, the dye-containing layer becomes soluble in the solvent. The dye-containing layer formed by using a dye solution of the re-dissolved dye reproduces reproduction properties and damage resistance which are not inferior to those of the original dye-containing layer. Consequently, the used dye-containing layer can be recycled.

DETAILED DESCRIPTION OF THE PREFERRED EMBODIMENTS

Figure 1:
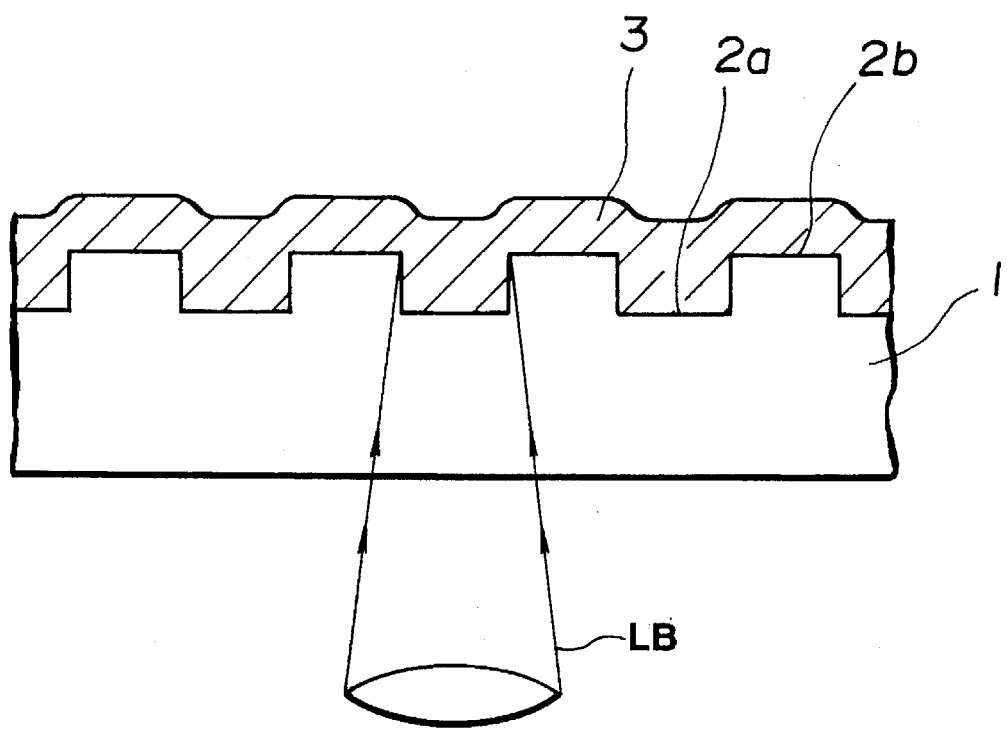
FIG. 1 is a cross-sectional view showing essential portions of an exemplary structure of an optical information recording medium according to the present invention.
Figure 2:
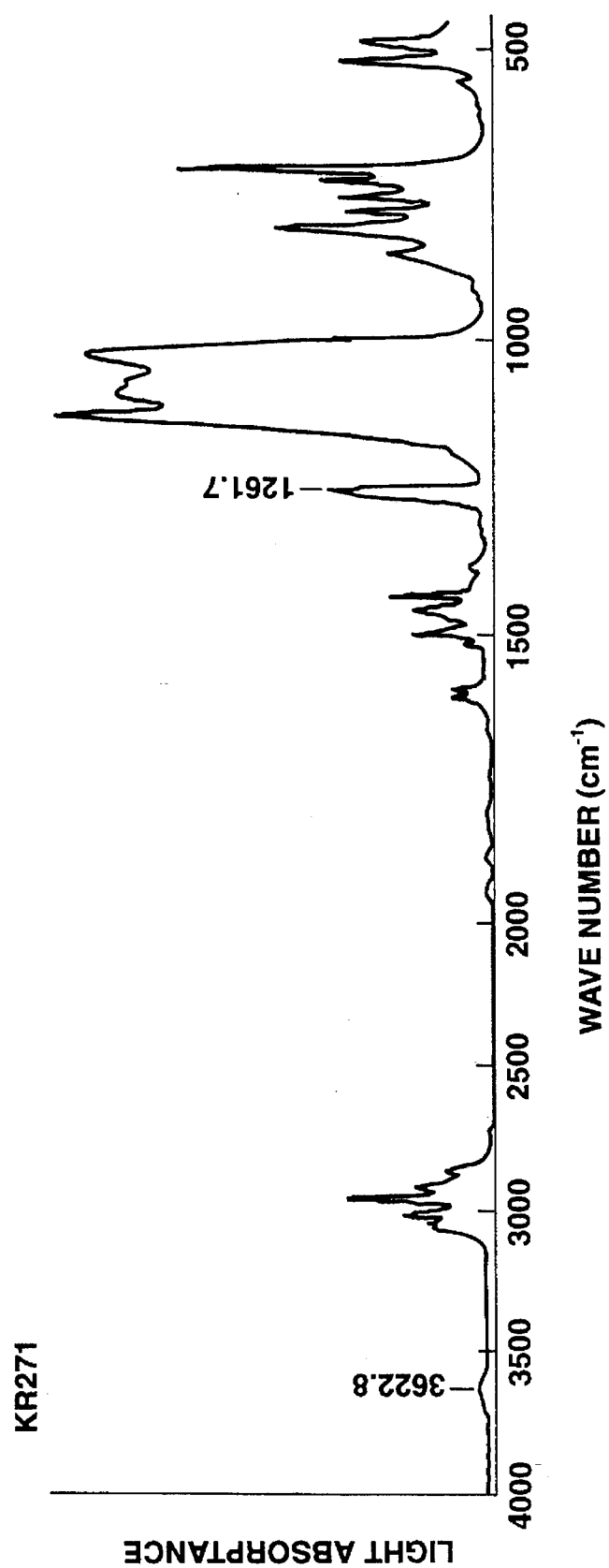
FIG. 2 is a graph showing an FT-IR spectrum of KR271.
Figure 3:
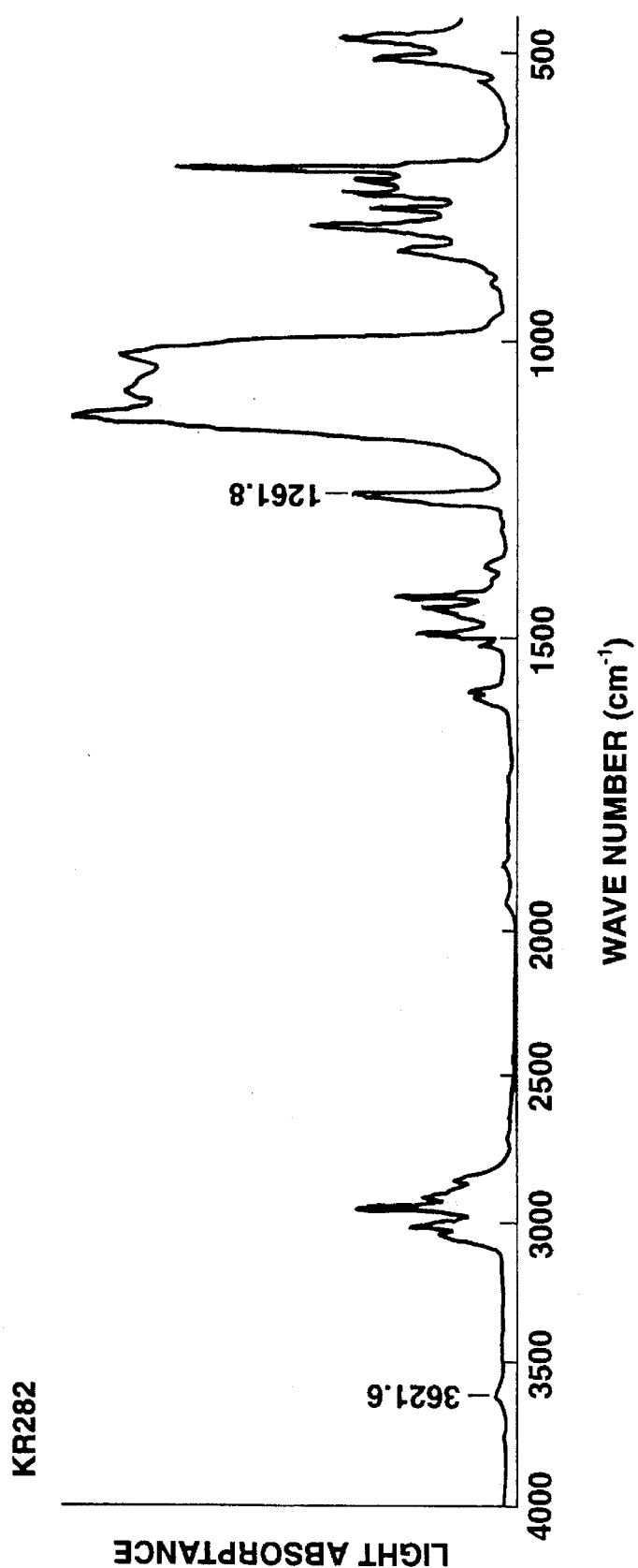
FIG. 3 is a graph showing an FT-IR spectrum of KR282.
Figure 4:
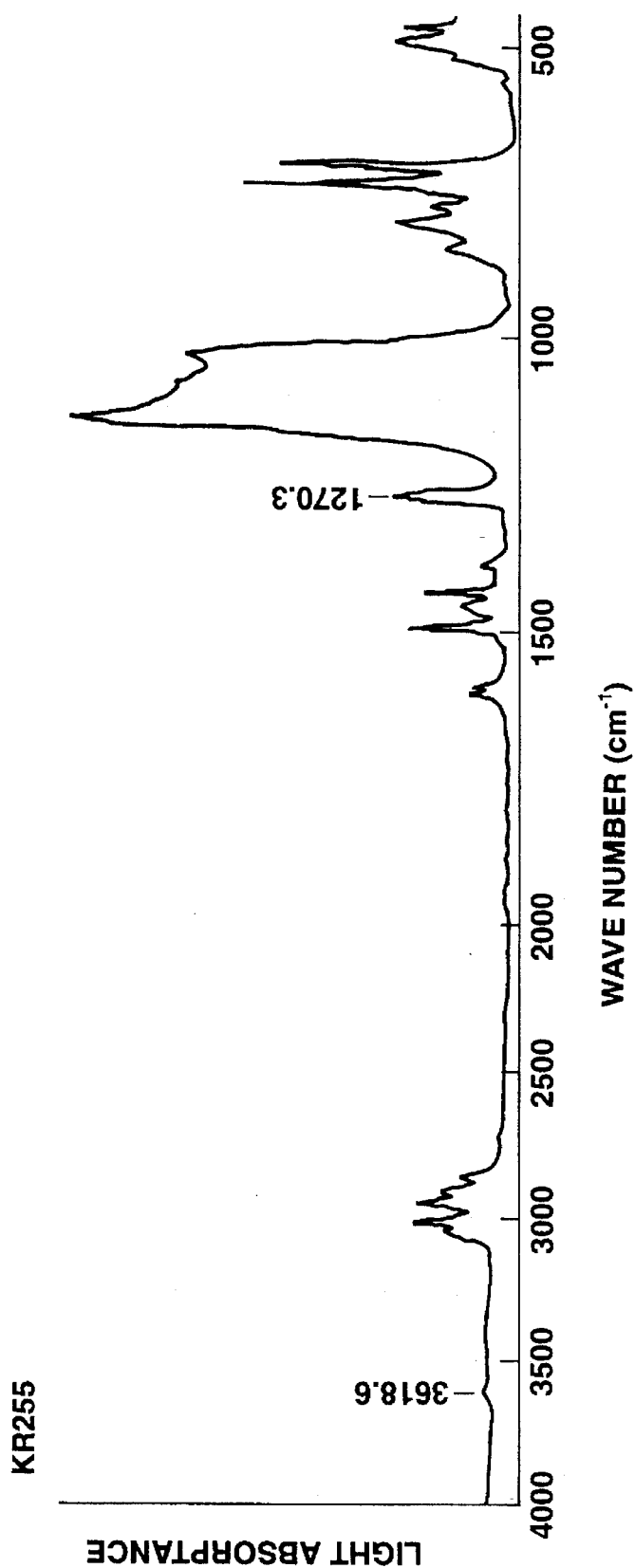
FIG. 4 is a graph showing an FT-IR spectrum of KR255.
Figure 5:
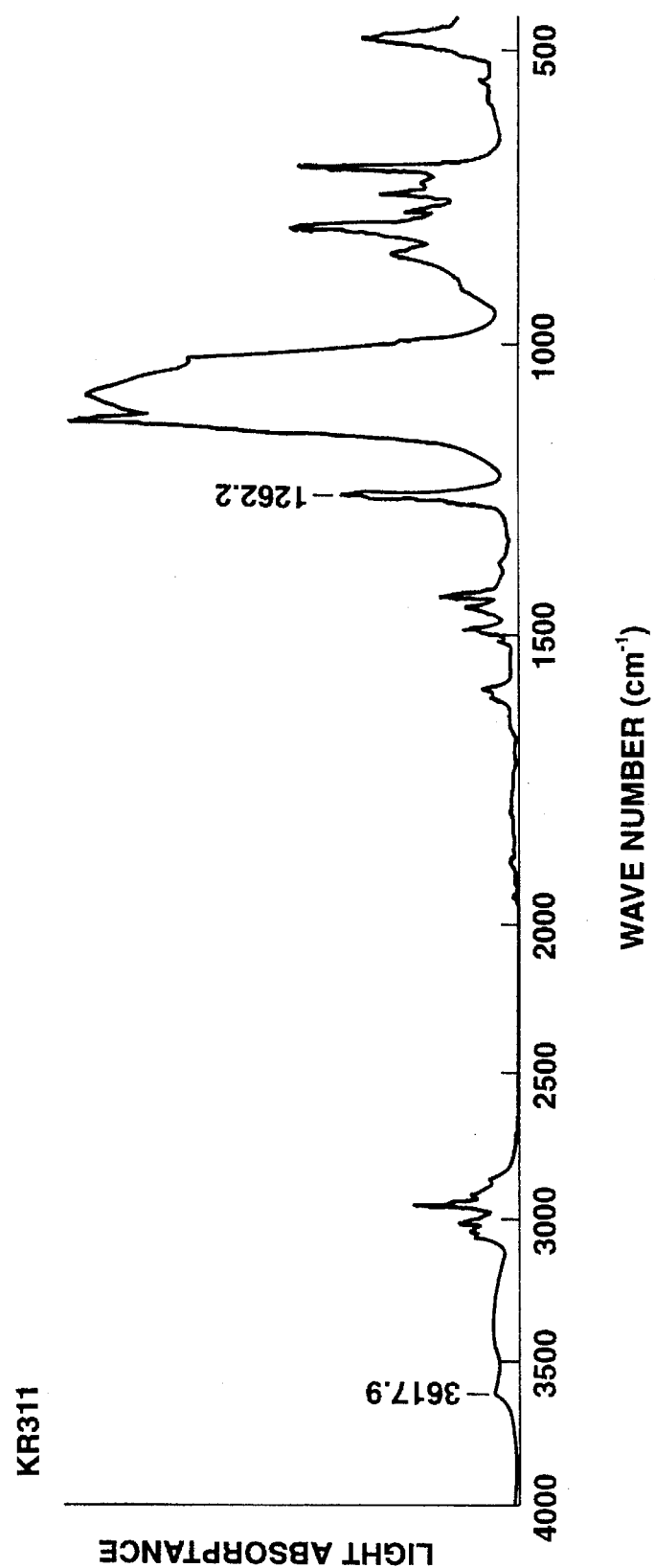
FIG. 5 is a graph showing an FT-IR spectrum of KR311.

The optical information recording medium according to the present invention has a dye-containing layer 3 having a reflectance of 15 to 25% as a reflective layer formed on a substrate 1 having recess-shaped pit parts 2a and projected land parts 2b corresponding to information signals, guide grooves and address code pits formed therein, as shown in FIG. 1.

In the optical information medium of this structure, a readout light LB radiated from the side of the substrate 1 is reflected on the boundary between the substrate 1 and the dye-containing layer 3 and the boundary between the dye-containing layer 3 and the air, causing multiple interference, which is utilized for reproducing signals. Consequently, the dye-containing layer 3 has low resistance to damages. If the surface of the dye-containing layer is damaged or worn to deteriorate in shape in contact with foreign matters, turbulence is generated in the multiple interference of the light, disturbing reproduction of signals.

Thus, in the present invention, the silicon varnish is used as the polymeric material forming the dye-containing layer 3 and the titanium coupling agent is used as the additive, in order to improve the damage resistance of the dye-containing layer 3 and to maintain satisfactory reproduction characteristics even in contact with foreign matters.

The silicon varnish can be expressed by a chemical formula, $R_a(OH)_bSiO(R_2SiO)_nSiR_c(OH)_d$, with R denoting $CH_3$ and a, b, c and d denoting integers satisfying conditions of a+b=3, c+d=3. This silicon varnish can be usually obtained in the form of being dissolved in a solvent such as xylene or toluene.

To form the dye-containing layer 3 using such a silicon varnish, the silicon varnish dissolved in the solvent and the dye material is further dissolved in a solvent to prepare a dye-containing solution, which is applied onto the substrate as a coating. The solvent is then dried to be removed from the coating. As the solvent is dried to be removed from the coating, the silicon varnish is condensed with the OH group as a functional group to form the dye-containing layer 3 of high hardness. In the optical information recording medium having the dye-containing layer 3 thus produced as the reflective layer, contact with foreign matters does not cause damage or wear to the dye-containing layer 3, and satisfactory reproduction characteristics can be maintained.

The hardness of the dye-containing layer 3 increases as the silicon varnish is highly condensed. Consequently, it order to further improve the damage resistance of the dye-containing layer 3, a silicon varnish containing a greater amount of OH group as a reacting portion of condensation is more advantageous. However, if the silicon varnish contains an excessive amount of OH group, the permeability of the dye-containing layer 3 is lowered, and reproduction by the recording/reproducing apparatus for mini disc is difficult. In consideration of the above, it is desirable to use the silicon varnish containing the OH group which is 18 to 25% of the $CH_3$ group.

A titanium coupling agent may also be added to the dye-containing layer 3, other than the silicon varnish and the dye material. The titanium coupling agent reacts in chelate reaction with the Si—OH structure of the silicon varnish, raising the crosslinking properties. Thus, the hardness of the dye-containing layer is improved, and the damage resistance is raised so that damage or wear is not easily caused.

In addition, the dye-containing layer 3 containing the titanium coupling agent is soluble into the solvent, and its compositions are recoverable. The dye-containing layer 3 reformed by using the recovered compositions reproduces reproduction properties and damage resistance which are not inferior to those of the original dye-containing layer 3. Consequently, the used dye-containing layer can be reused, contributing significantly to reduction in production cost for the optical information recording medium.

For the titanium coupling agent to be added to the dye-containing layer 3, any known titanium coupling agent can be used. Particularly, titanium coupling agents as shown by the following Chemical Formulas 1 to 3 are preferred.

Chemical Formula 1

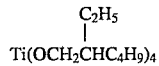

Chemical Formula 2

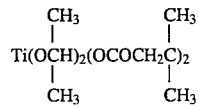

Chemical Formula 3

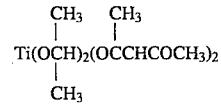

It is preferred to add these titanium coupling agents at a rate of 7 to 10% by weight to the polymeric material. If the amount of the titanium coupling agent added is at a rate of less than 7% by weight of the polymeric material, the effect of the titanium coupling agent is insufficient, and the damage resistance of the dye-containing layer 3 cannot be sufficiently improved. If the amount of the titanium coupling agent added is greater than 10% by weight of the polymeric material, the addition of the titanium coupling agent deteriorates the damage resistance of the dye-containing layer 3.

In the present invention, as described above, the dye-containing layer 3 is used as the reflective layer, and the reflectance of the dye-containing layer 3 is limited to 15 to 25%. Thus, signals can be reproduced from the optical information recording medium by using a recording/reproducing device for a medium having reflectance of 15 to 25% such as the magneto-optical disc.

Consequently, the type and the mixing ratio of dye materials and polymeric materials to be contained in the dye-containing layer 3 can be selected in accordance with the range of reflectance. In selecting the material and the mixing ratio, it is desirable to set the real number part n of the complex refractive index of the dye-containing layer 3 to 1.84 or greater. The dye-containing layer 3 having the real number part of its complex refractive index of 1.84 or greater is capable of exhibiting reflectance of 15 to 25% only by adjusting the film thickness within a practical range; Thus, film forming conditions can be easily set.

As the dye material, any of organic dyes and inorganic dyes capable of generating reflectance of the reflective layer within the above range, preferably having a real number part n of the complex refractive index of the dye-containing layer 3 equal to 1.84 or greater, can be used. The organic dye can be exemplified by cyanine dyes, such as NK529 (trade name) produced by Nippon Kanko Shikiso as shown by Chemical Formula 4, and SRC-8 (trade name) produced by Sony Corporation as shown by Chemical Formula 5.

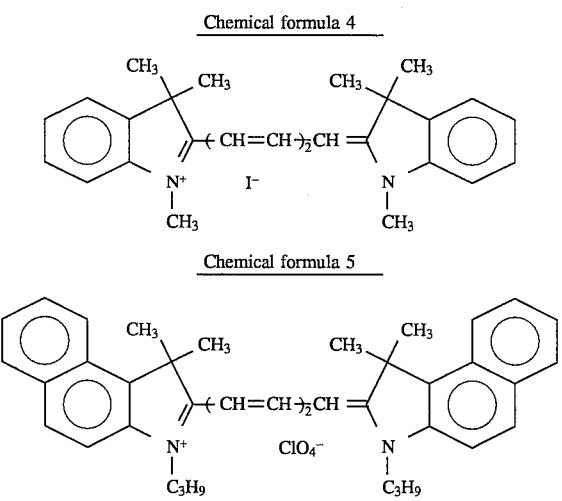

In addition, a light stabilizer may be added to the dye-containing layer 3 for preventing light discoloration of the dye material. As the light stabilizer, an electron donative material, such as amine group, or a material having an energy level lower than the energy level of an excited dye, such as a nickel complex, can be used.

The transparent substrate having the above-described reflective layer formed thereon which is used for a conventional optical information recording can be used. The transparent substrate can be composed of materials such as glass, polycarbonate (PC) and polyethylene terephthalate.

Preferred embodiments of the present invention will now be described based upon experiment results.

The silicon varnishes used in the present embodiment are of four types, that is, KR271, KR282, KR255 and KR311, produced by Shinetsu Silicone. First, FT-IR spectra of the four silicon varnishes were measured for investigating the ratio of the OH group to the $CH_3$ group.

In the FT-IR spectra, absorption peaks are observed at around 3600 $cm^{-1}$ and around 1260 $cm^{-1}$. The absorption peak observed at around 3600 $cm^{-1}$ is of absorption accompanied by stretching vibration of a single O—H structure not having intramolecular bonding, and the peak intensity is correlated with the content rate of the Si—OH structure in the silicon varnish. The absorption peak observed at around 1260 $cm^{-1}$ is of absorption accompanied by stretching vibration of Si—$CH_3$, and the peak intensity is correlated with the content rate of the Si—$CH_3$ structure in the silicon varnish.

Consequently, the ratio of the absorption peak intensity at around 3600 $cm^{-1}$ to the absorption peak intensity at around 1260 $cm^{-1}$ can represent the ratio of the Si—OH structure to the Si—$CH_3$ structure in the silicon varnish. Thus, the ratios of the Si—OH structure to the Si—$CH_3$ structure, that is the Si—OH/Si—$CH_3$ ratio, of the silicon varnishes were found from the FT-IR spectra. The results are shown in Table 1.

TABLE 1

|  | (Si—OH/Si—$CH_3$) ratio (%) |
|---|---|
| KR271 | 51 |
| KR282 | 29 |
| KR255 | 25 |
| KR311 | 20 |

In the following embodiment, optical discs were produced using various silicon varnishes having different content rates of the Si—OH structure, and then damage resistance and permeability were investigated.

EMBODIMENT 1

A dye material, a polymeric material and an additive were dissolved at a ratio by weight of dye material: polymeric material: additive=1:1:0.2, in a solvent at a ratio by weight of 100, so as to prepare a dye-containing coating. The cyanine dye as expressed by Chemical Formula 6 was used as the dye material. A silicon varnish, KR271, produced by Shinetsu Silicone, was used as the polymeric material. A singlet oxygen deactivation agent, IRG-003, produced by Nippon Kayaku, as expressed by Chemical Formula 7 was used as the additive. 3-hydroxy-3-methyl-2-butanone, produced by Tokyo Kasei Kogyo was used as the solvent.

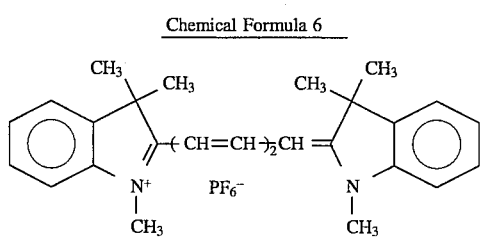

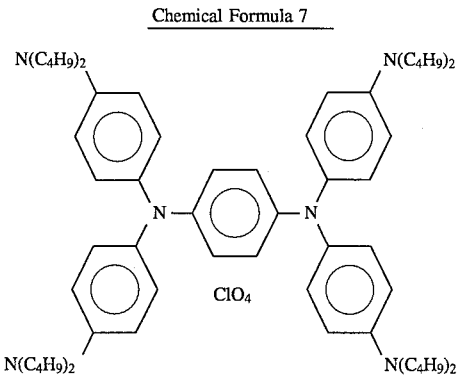

EMBODIMENTS 2 TO 4

Dye-containing coatings were prepared in a manner similar to Embodiment 1 except for using silicon varnishes shown in Table 2 as the polymeric material.

TABLE 2

|  | Straight Silicon Varnish (%) |
| --- | --- |
| Embodiment 1 | KR271 |
| Embodiment 2 | KR282 |
| Embodiment 3 | KR255 |
| Embodiment 4 | KR311 |

The dye-containing coatings prepared in Embodiments 1 to 4 were applied, by the spin coating method, onto a transparent substrate having pit parts and land parts formed therein in advance, and were dried to form dye-containing layers. Thus, optical discs were produced. Then, the optical discs were introduced into MD disc cartridges for vibration test and rubbing test, and generation of damages on the surface of the dye-containing layer was visually observed. The results of evaluation of damage generation rates of the optical discs are shown in Table 3. Relations between the Si—OH/Si—CH$_3$ ratio and the damage resistance are shown in FIG. 6.

TABLE 3

|  | Damage Generation Rate |
| --- | --- |
| Embodiment 1 | 10 |
| Embodiment 2 | 37 |
| Embodiment 3 | 43 |
| Embodiment 4 | 48 |

Figure 6:
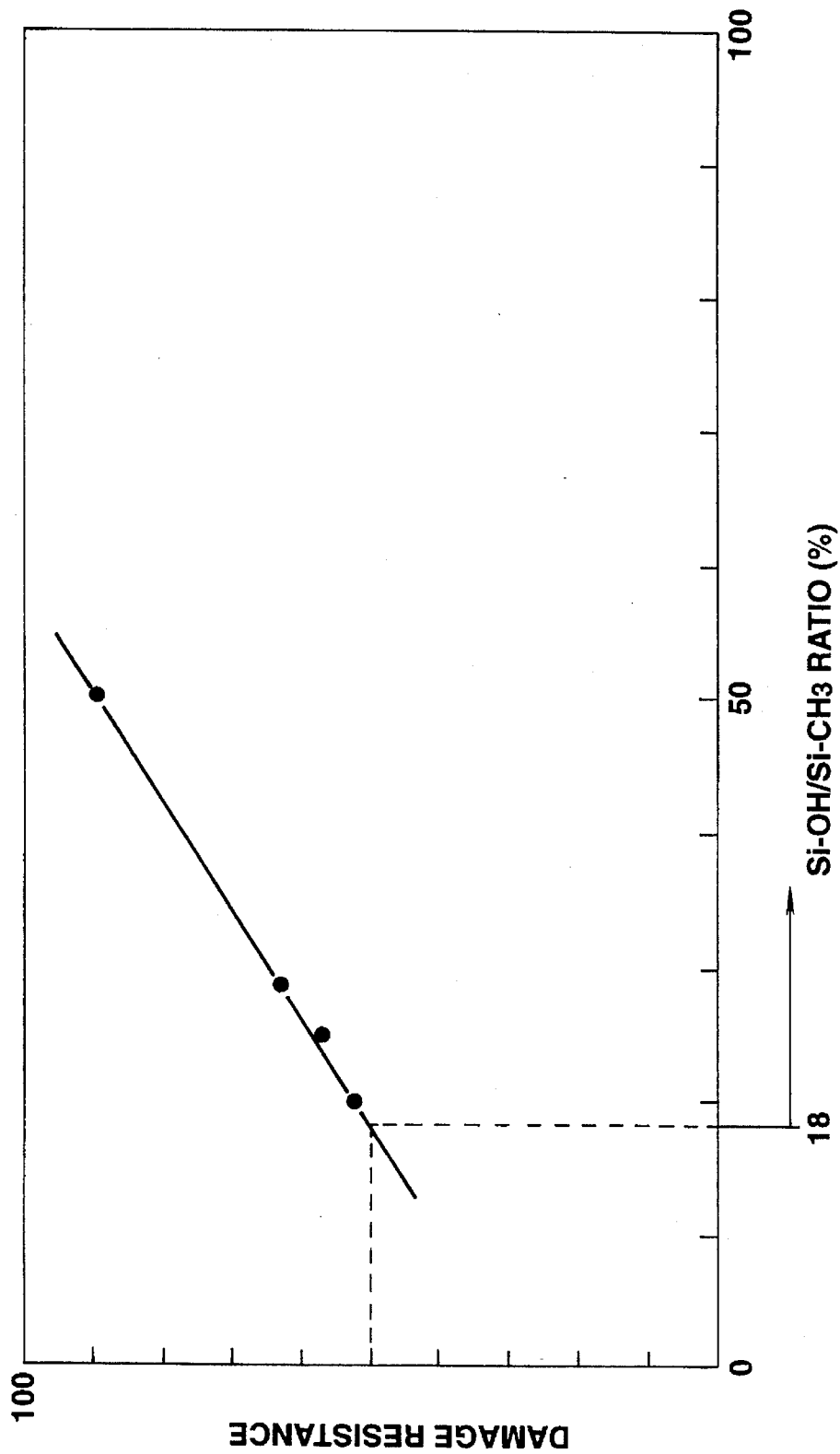
FIG. 6 is a graph showing relations between an Si—OH/Si—$CH_3$ ratio and damage resistance.

As seen from Table 3 and FIG. 6, the optical discs using the dye-containing coatings of Embodiments 1 to 4 have low damage generation rates and satisfactory damage resistance. Particularly, the silicon varnish having an Si—OH/Si—CH$_3$ ratio of 18% or greater causes the damage resistance rate of 50 or higher.

Therefore, in order to produce an optical disc of high damage resistance, it is effective to use the silicon varnish, particularly the silicon varnish of high content rate of the Si—OH structure, as the polymeric material of the dye-containing layer.

The dye-containing coatings prepared in Embodiments 1 to 4 were applied, by the spin coat method, onto a glass substrate, and were dried to form dye-containing layers. The permeability of these dye-containing layers at 780 nm was measured by using a recording spectrophotometer, U-3210 (trade name) produced by Hitachi. The permeability of the dye-containing layers at 780 nm is shown in Table 4, and relations between the Si—OH/Si—CH$_3$ and the permeability at 780 nm are shown in FIG. 7.

TABLE 4

|  | Permeability (%) |
| --- | --- |
| Embodiment 1 | 66.26 |
| Embodiment 2 | 68.21 |
| Embodiment 3 | 68.84 |
| Embodiment 4 | 71.51 |

Figure 7:
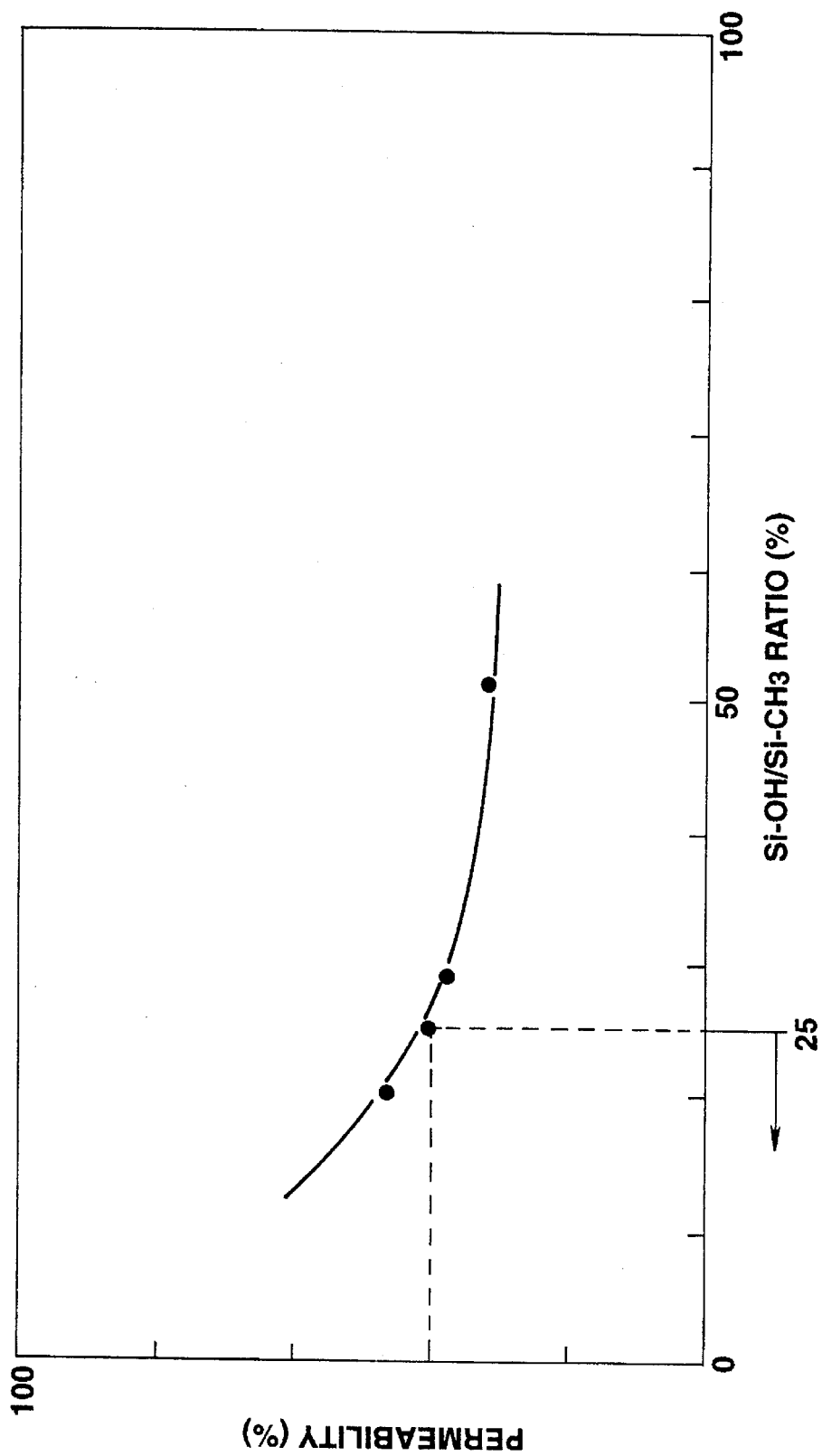
FIG. 7 is a graph showing relations between an Si—OH/Si—$CH_3$ ration and permeability at 780 nm.

As seen from Table 4 and FIG. 7, the permeability of the dye-containing layer decreases as the Si—OH/Si—CH$_3$ ratio of the silicon varnish increases. For reproduction by the MD recording/reproducing apparatus, it is necessary that the permeability be 70% or higher, and that the Si—OH/Si—CH$_3$ ratio of the silicon varnish be 25% or smaller.

EMBODIMENT 5-1

A dye material, a polymeric material, a titanium coupling material and a light stabilizer were dissolved in a solvent at a ratio of dye material: polymeric material: titanium coupling material: light stabilizer=2:2:0.2:0.2, to prepare a dye-containing coating. The dye material, the polymeric material, the titanium coupling material, the light stabilizer and the solvent used in the present embodiment are as follows.

dye material: cyanine dye, NK529 (trade name) produced by Nippon Kanko Shikiso, as expressed by Chemical Formula 4 polymeric material: silicon varnish, KR311 (trade name) produced by Shinetsu Silicone, as expressed by Chemical Formula 8 titanium coupling agent: TOT (trade name) produced by Nippon Soda, as expressed by Chemical Formula 1 light stabilizer: singlet oxygen deactivating agent, IRG003 (trade name) produced by Nippon Kayaku solvent: 3-hydroxy-3-methyl-2-butanone, produced by Tokyo Kasei Kogyo The structure of the silicon varnish is shown by Chemical Formula 8.

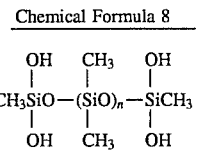

Chemical Formula 8

The dye-containing coating thus prepared was applied by spin coat onto the substrate having pits formed therein in advance, to produce a sample medium. A dye-containing coating dried and dissolved at room temperatures was also applied by spin coat onto the substrate having pits formed therein, to produce sample media.

Signal characteristics and damage resistance of these sample media were investigated. The signal characteristics were evaluated as signal modulation factor $I_{11}/I_{TOP}$. The signal modulation factor $I_{11}/I_{TOP}$ is a ratio of the amount of reflected light $I_{11}$ of a pit part of the maximum length to the amount of reflected light $I_{TOP}$ of a land part. The damage resistance was evaluated through shaking test of the sample media incorporated in a cartridge for mini disc and visual observation of presence or absence of scars after the shaking test.

Results of investigation of the signal modulation factor $I_{11}/I_{TOP}$ and the presence or absence of scars after the shaking test are shown in Table 5.

TABLE 5

| Titanium coupling agent: TOT | | |
| --- | --- | --- |
| Number of Times of Drying and Dissolving | Modulation Factor $I_{11}/I_{TOP}$ | Presence or Absence of Scars |
| 0 | 0.598 | Absent |
| 1 | 0.593 | Absent |
| 2 | 0.591 | Absent |
| 3 | 0.596 | Absent |
| 4 | 0.593 | Absent |

EMBODIMENT 5-2

A dye-containing coating was prepared as in Embodiment 5-1 except for using TC-100 (trade name) produced by Matsumoto Seiyaku, expressed by Chemical Formula 2, as the titanium coupling agent. The dye solution was applied by spin coat, directly or after the predetermined number of times of drying and dissolving, onto the substrate having pits formed therein, to produce sample media.

Signal characteristics and damage resistance of the resulting sample media were investigated. Results are shown in Table 6.

TABLE 6

| | Titanium coupling agent: TC-100 | |
|---|---|---|
| Number of Times of Drying and Dissolving | Modulation Factor $I_{11}/I_{TOP}$ | Presence or Absence of Scars |
| 0 | 0.593 | Absent |
| 1 | 0.591 | Absent |
| 2 | 0.600 | Absent |
| 3 | 0.588 | Absent |
| 4 | 0.593 | Absent |

EMBODIMENT 5-3

A dye-containing coat was prepared as in Embodiment 5-1 except for using T-50 (trade name) produced by Nippon Soda, expressed by Chemical Formula 3, as the titanium coupling agent. The dye solution was applied by spin coat, directly or after the predetermined number of times of drying and dissolving, onto the substrate having pits formed therein, to produce sample media.

Signal characteristics and damage resistance of the resulting sample media were investigated. Results are shown in Table 7.

TABLE 7

| | Titanium coupling agent: T-50 | |
|---|---|---|
| Number of Times of Drying and Dissolving | Modulation Factor $I_{11}/I_{TOP}$ | Presence or Absence of Scars |
| 0 | 0.561 | Absent |
| 1 | 0.555 | Absent |
| 2 | 0.557 | Absent |
| 3 | 0.553 | Absent |
| 4 | 0.551 | Absent |

COMPARATIVE EXAMPLE 1-1

A dye material, a polymeric material and a light stabilizer were dissolved in a solvent at a ratio of dye material: polymeric material: light stabilizer=2:2:0.2. The dye material, the polymeric material and the light stabilizer are similar to those used in Embodiment 5-1.

As in Embodiment 5-1, the dye solution was applied by spin coat, directly or after the predetermined number of times of drying and dissolving, onto the substrate having pits formed therein, to produce sample media. Signal characteristics and damage resistance of the resulting sample media were investigated. Results are shown in Table 8.

TABLE 8

| | Titanium coupling agent: not added | |
|---|---|---|
| Number of Times of Drying and Dissolving | Modulation Factor $I_{11}/I_{TOP}$ | Presence or Absence of Scars |
| 0 | 0.560 | Absent |
| 1 | 0.460 | Present |
| 2 | — | — |

TABLE 8-continued

| | Titanium coupling agent: not added | |
|---|---|---|
| Number of Times of Drying and Dissolving | Modulation Factor $I_{11}/I_{TOP}$ | Presence or Absence of Scars |
| 3 | — | — |
| 4 | — | — |

In comparison of Tables 5 to 7 with Table 8, in Embodiments 5-1 to 5-3 in which the titanium coupling agents were added to the dye solution, media having signal characteristics and damage resistance equivalent to those of media using the dye solution without being dried and dissolved were produced even by using the dye solution dried and dissolved for plural times. On the contrary, in Comparative Example 1-1 in which the titanium coupling agent was not added to the dye solution, only a medium having signal characteristics and damage resistance inferior to those of a media using the dye without being dried and dissolved was produced by using the dried and dissolved dye solution.

Thus, adding the titanium coupling agent is effective for preventing deterioration of properties due to drying and dissolving of the dye-containing layer, and realizes reuse of the dye-containing layer.

The sample media produced in Embodiments 5-1 to 5-3 and Comparative Example 1-1 exhibit signal modulation factors $I_{11}/I_{TOP}$ in conformity with the standard of signal modulation factors of the mini disc system.

EMBODIMENT 6-1

A dye-containing solution was prepared as in Embodiment 5-1 except for changing the amount of TOT added. The solution was directly applied by spin coat onto the substrate having pits formed therein, to produce a sample medium. The resulting sample medium was incorporated in an MD cartridge so as to carry out the shaking test, and the damage generation rate was investigated.

Figure 8:
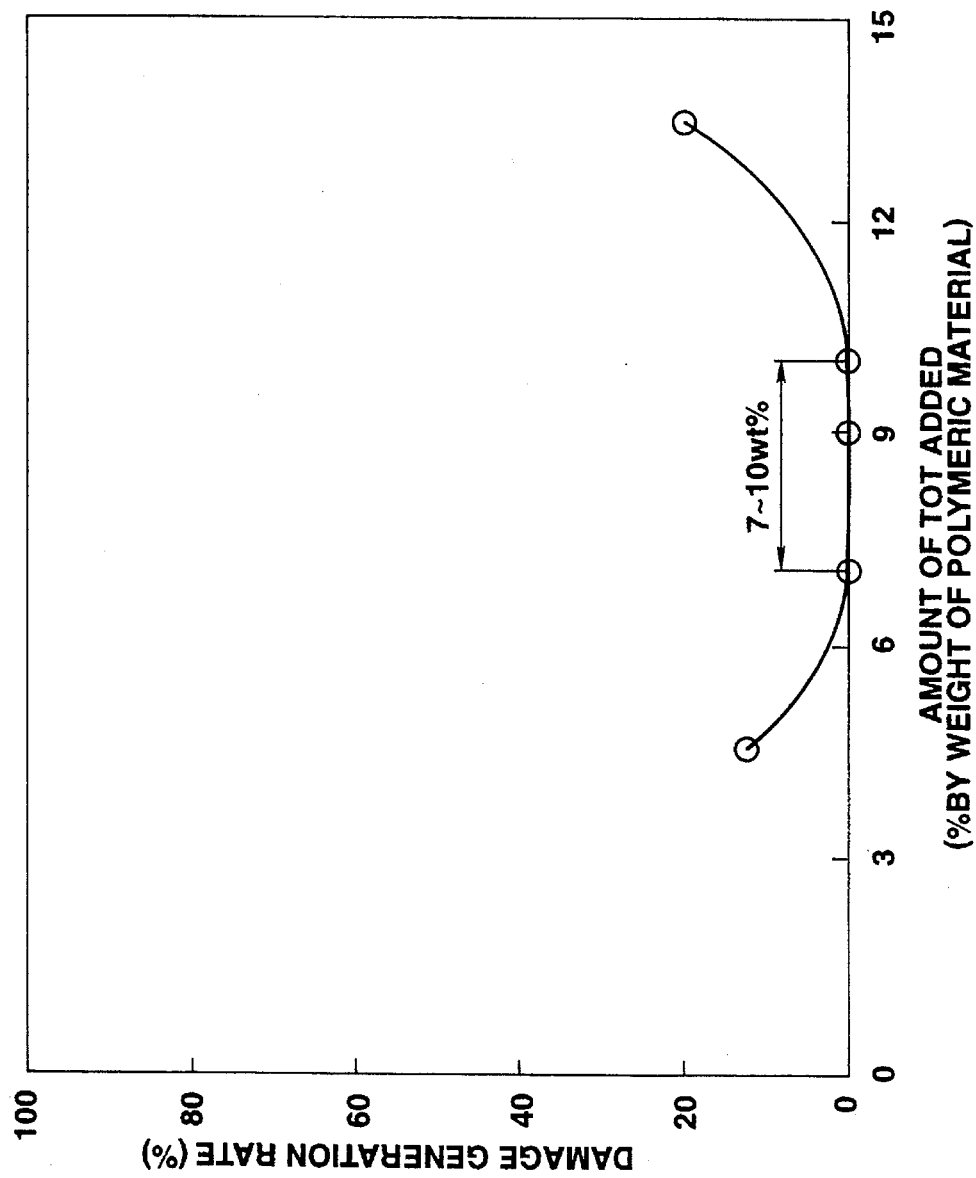
FIG. 8 is a graph showing relations between the amount of TOT added and damage generation rate.

Relations between the amount of TOT added and the damage generation rate are shown in FIG. 8. In FIG. 8, the amount of TOT added is expressed by percentage by weight in relation to the polymeric material.

EMBODIMENT 6-2

A dye solution was prepared as in Embodiment 5-2 except for changing the amount of TC-100 added. The solution was directly applied by spin coat onto the substrate having pits formed therein, to produce a sample medium. The resulting sample medium was incorporated in an MD cartridge to carry out the shaking test, and the damage generation rate was investigated.

Figure 9:
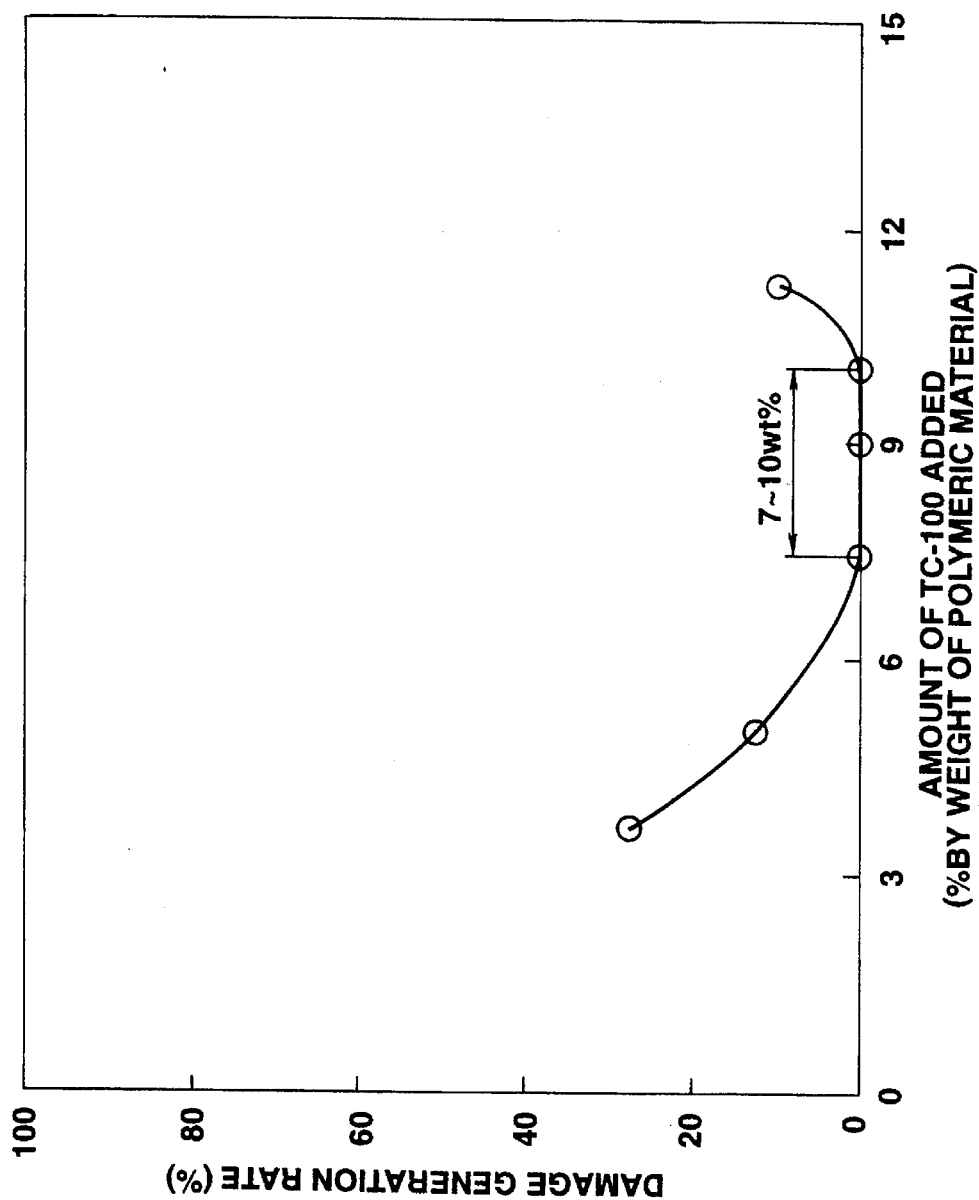
FIG. 9 is a graph showing relations between the amount of TC-100 added and damage generation rate.

Relations between the amount of TC-100 added and the damage generation rate are shown in FIG. 9. In FIG. 9, the amount of TC-100 added is expressed by percentage by weight in relation to the polymeric material.

EMBODIMENT 6-3

A dye solution was prepared as in Embodiment 5-3 except for changing the amount of T-50 added. The solution was directly applied by spin coat onto the substrate having pits formed therein, to produce a sample medium. The resulting sample medium was incorporated in an MD cartridge to carry out the shaking test, and the damage generation rate was investigated.

Figure 10:
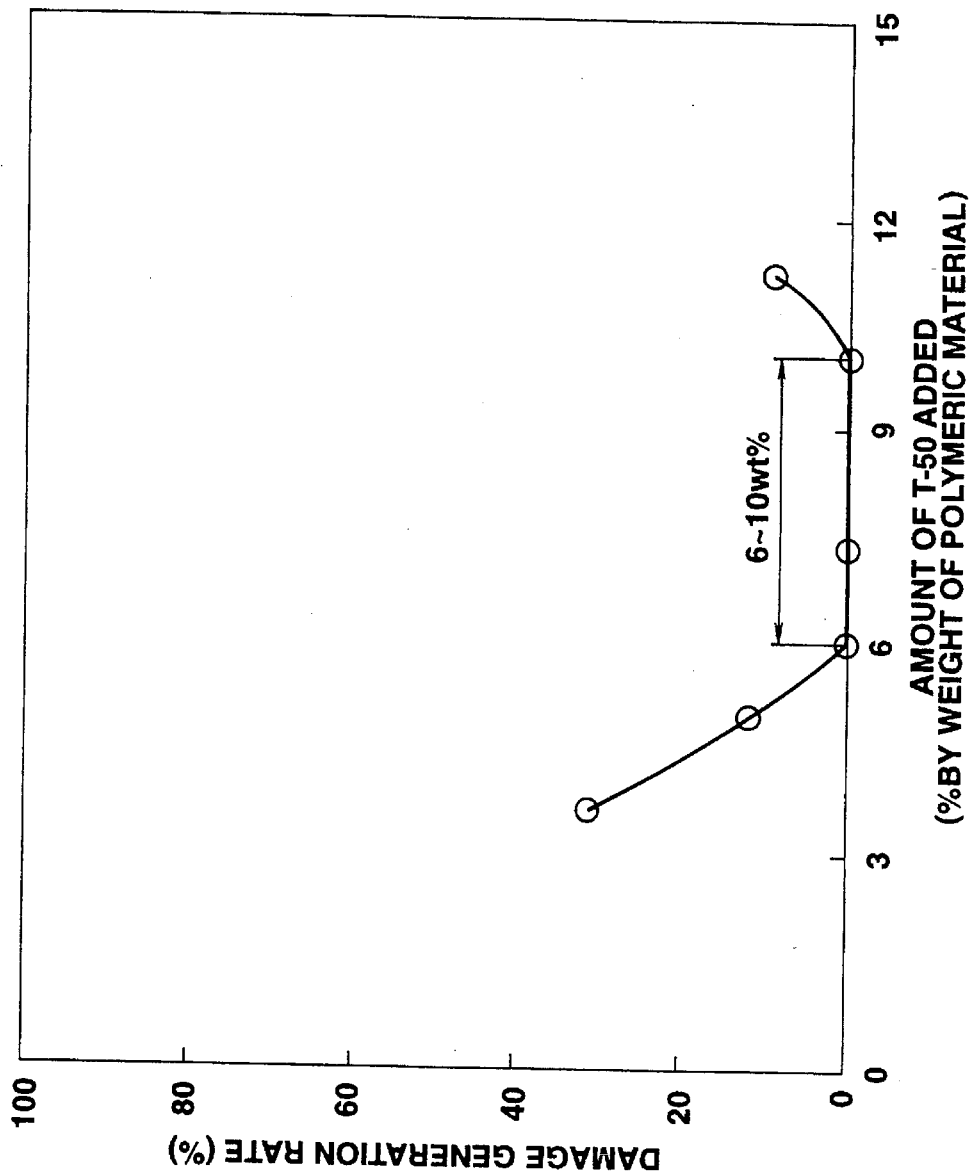
FIG. 10 is a graph showing relations between the amount of T-50 added and damage generation rate.

Relations between the amount of T-50 added and the damage generation rate are shown in FIG. 10. In FIG. 10, the amount of T-50 added is expressed by percentage by weight in relation to the polymeric material.

As shown in FIGS. 8 to 10, the damage generation rate of the media differs in accordance with the amount of TOT, TC-100 and T-50 added as the titanium coupling agents. Thus, the damage resistance of the medium can be controlled by adding the titanium coupling agent. By adding any of the above titanium coupling agents at a rate of 7 to 10% by weight of the polymeric material, the damage generation rate of the medium was reduced to zero, and the damage resistance can be improved.

As is clear from the above description, the optical information recording medium of the present invention has a reflective layer, composed mainly of the dye material and the polymeric material and having a reflectance of 15 to 25%, formed on the transparent substrate having pits and lands corresponding to information signals formed therein. The silicon varnish is used as the polymeric material forming the dye-containing layer, and the titanium coupling agent, is added to the reflective layer. Therefore, the optical information recording medium is capable of reproducing signals therefrom by using the recording/reproducing apparatus for a low reflectance medium such as the magneto-optical disc, and has satisfactory damage resistance for maintaining satisfactory reproduction properties even in contact with foreign matters. Also, even though the dye-containing layer is dissolved and reused, reproduction properties and damage resistance equivalent to those of the original dye-containing layer can be reproduced. Consequently, improvement of practicality and reduction in production costs of the optical information recording medium can be achieved.

What is claimed is:

1. An optical information recording media comprising a transparent substrate having pits and lands corresponding to information signals formed therein, and a reflective layer disposed on the transparent substrate, the reflective layer having a reflectance of 15 to 25% and comprising a dye material; a polymeric material, said polymeric material being a silicon varnish wherein the ratio of Si—OH groups to Si—CH$_3$ groups is from about 18 to about 25%; and from about 7 to about 10% by weight based on the weight of said polymeric material of a titanium coupling agent.

2. The optical information recording medium as claimed in claim 1, wherein the titanium coupling agent is selected from titanium coupling agents expressed by

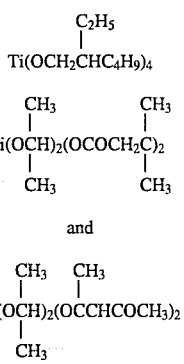

3. The optical information recording medium as claimed in claim 1, wherein the dye material is a cyanine dye.

4. The optical information recording medium as claimed in claim 3, wherein the cyanine dye is selected from cyanine dyes expressed by

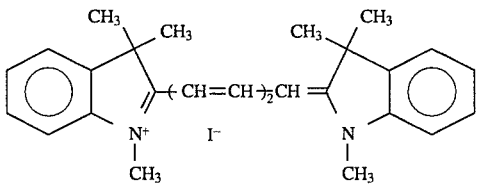

and

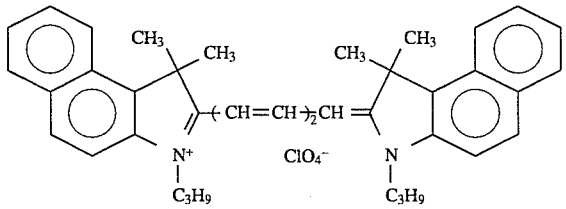

5. The optical information recording medium as claimed in claim 1, wherein the reflective layer has a complex refractive index having a real number part n of 1.84 and greater.

* * * * *